United States Patent
Bergey et al.

(10) Patent No.: US 10,386,539 B2
(45) Date of Patent: Aug. 20, 2019

(54) METHOD OF MODELLING A SUBSURFACE VOLUME

(71) Applicant: Total S.A., Paris (FR)

(72) Inventors: Pierre Bergey, Saint Germain en Laye (FR); Pui Wa Li, Rancho Palos Verdes, CA (US)

(73) Assignee: Total S.A., Courbevoie (FR)

( * ) Notice: Subject to any disclaimer, the term of this patent is extended or adjusted under 35 U.S.C. 154(b) by 0 days.

(21) Appl. No.: 15/319,280

(22) PCT Filed: Jun. 18, 2015

(86) PCT No.: PCT/EP2015/063778
§ 371 (c)(1),
(2) Date: Dec. 15, 2016

(87) PCT Pub. No.: WO2015/193465
PCT Pub. Date: Dec. 23, 2015

(65) Prior Publication Data
US 2017/0131434 A1    May 11, 2017

(30) Foreign Application Priority Data

Jun. 19, 2014  (GB) .................................. 1410982.1

(51) Int. Cl.
*G06G 7/48*        (2006.01)
*G01V 99/00*      (2009.01)

(52) U.S. Cl.
CPC ................................. *G01V 99/005* (2013.01)

(58) Field of Classification Search
CPC .................................................. G01V 99/005
(Continued)

(56) References Cited

U.S. PATENT DOCUMENTS 7,047,165 B2    5/2006  Balaven et al.
2005/0203725 A1  9/2005  Jenny et al.
(Continued)

FOREIGN PATENT DOCUMENTS

WO    WO-2008008121 A2    1/2008
WO    WO-2012108917 A1    8/2012

OTHER PUBLICATIONS

Brassart, P., "International Search Report," prepared for PCT/EP2015/063778, dated Jan. 28, 2016, five pages.
(Continued)

*Primary Examiner* — Hugh M Jones
(74) *Attorney, Agent, or Firm* — Winstead PC

(57) ABSTRACT

Disclosed is a method of modelling a subsurface volume. The method comprises: discretizing said subsurface volume to define a grid comprising an array of cells (1, 2, 3), each cell being defined by cell faces, each cell having attributed thereto one or more high order properties (A,B); dividing each cell into a plurality of sub-cells, said plurality of sub-cells comprising: a plurality of central sub-cells adjacent a center of the cell, and a plurality of peripheral sub-cells, each adjacent a corresponding cell face; for each of said central sub-cells, and for each of said peripheral sub-cells for which the cell adjacent to that peripheral sub-cell has attributed thereto the same one or more high order properties as that of the cell in which said peripheral sub-cell is comprised, attributing one or more low order property values (c, d, e, x, y, z) in accordance with the high order property attributed to the cell in which said peripheral sub-cell is comprised; for each of said peripheral sub-cells for which the cell adjacent to that peripheral sub-cell has attributed thereto a different one or more high order properties than that of the cell in which said peripheral sub-cell is comprised, attributing one or more low order property values (c, d, e, x, y, z) in accordance with the high order
(Continued)

property attributed to the adjacent cell; and determining one or more low order property values for each cell based on the one or more low order property values attributed to each cell's component sub-cells.

11 Claims, 1 Drawing Sheet

(58) Field of Classification Search
USPC .......................................................... 703/10
See application file for complete search history.

(56) References Cited

U.S. PATENT DOCUMENTS

2006/0052938 A1   3/2006   Thorne et al.
2014/0136171 A1   5/2014   Sword, Jr. et al.

OTHER PUBLICATIONS

Li, P.W., et al., "Petro-Physical Properties Bias Around Uncertain Facies Boundary—Analysis, Correction by Conditional Property Interface Filler (CoPIF) and Impact on Ensemble-Based Assisted History Match," EMCOR XIV—14th European Conference on the Mathematics of Oil Recovery Catania, Sep. 8-11, 2014, 11 pages.

METHOD OF MODELLING A SUBSURFACE VOLUME

The present disclosure relates to methods of subsurface modelling, and in particular to attributing low order properties to cells of a grid describing the subsurface based upon attributed high order discrete properties of the grid.

The typical process to establish oil and gas production forecasts includes the construction of 3D subsurface models and flow simulation using such models as an input.

Subsurface models may comprise, for example, reservoir flow, basin, and geo-mechanical models. These comprise gridded 3D representations of the subsurface used as inputs to a simulator allowing the prediction of a range of physical properties as a function of controlled or un-controlled boundary conditions:

Reservoir flow models aim to predict fluid flow properties, primarily multi-phase rates (and composition), pressure and temperature, under oil and gas field or aquifer development scenarios.

Basin models aim to predict over time the types of hydrocarbon being generated out of kerogen, and the location of hydrocarbon trapping at geological timescales.

Geo-mechanical models aim to predict stress and stress related phenomenon such as heave/subsidence or failure in natural conditions or under oil and gas or aquifer development conditions.

Subsurface models are often generated using geo-statistical methods. Such models often include high level, discrete parameters which are variables that condition/control a number of lower order continuous parameters/variables. Discrete high level variables are typically used in subsurface modelling to capture geological heterogeneities of critical importance to the overall process. Discrete geological 3D parameters (e.g. facies, architectural elements) often display complex 3D relationships.

A simulation such as a Monte Carlo approach can be used to capture the less-than-perfect knowledge of the reservoir through multiple realizations, and ultimately compute forecast uncertainties. This approach assumes that the sampling of model space is unbiased. Reservoir models are built on 3D meshes according to specific constraints, of which the most used is Corner Point Geometry. In this setting, the space is divided into structured cells, where each cell comprises 8 corners.

In most cases, the grid geometry is certain while the petrophysical properties of the cell (or more specifically the grid in-filling) are uncertain. In some cases, however, the grid geometry may be uncertain as well. Variations of petrophysical properties are often governed by the concept of facies: a high order classification controlling petrophysical variations at a lower order. In a given realization, a cell is characterized by a single facies. Uncertainties pertaining to 3D petrophysical properties arise from the variations of the 3D facies classification and of the 3D petrophysical properties fully conditional upon facies.

It is typically assumed that facies boundaries coincide with grid boundaries. In reality the actual location of facies boundaries can be uncertain, and this assumption can bias the representation of modelled uncertainties. It would be desirable to mitigate this bias.

SUMMARY OF INVENTION

In a first aspect of the invention there is provided a method of modelling a subsurface volume comprising:

discretising said subsurface volume to define a grid comprising an array of cells, each cell being defined by cell faces, each cell having attributed thereto one or more high order properties;

dividing each cell into a plurality of sub-cells, said plurality of sub-cells comprising: a plurality of central sub-cells adjacent a centre of the cell, and a plurality of peripheral sub-cells, each adjacent a corresponding cell face;

for each of said central sub-cells, and for each of said peripheral sub-cells for which the cell adjacent to that peripheral sub-cell has attributed thereto the same one or more high order properties as that of the cell in which said peripheral sub-cell is comprised, attributing one or more low order property values in accordance with the high order property attributed to the cell in which said peripheral sub-cell is comprised;

for each of said peripheral sub-cells for which the cell adjacent to that peripheral sub-cell has attributed thereto a different one or more high order properties than that of the cell in which said peripheral sub-cell is comprised, attributing one or more low order property values in accordance with the high order property attributed to the adjacent cell; and determining one or more low order property values for each cell based on the one or more low order property values attributed to each cell's component sub-cells.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1A:
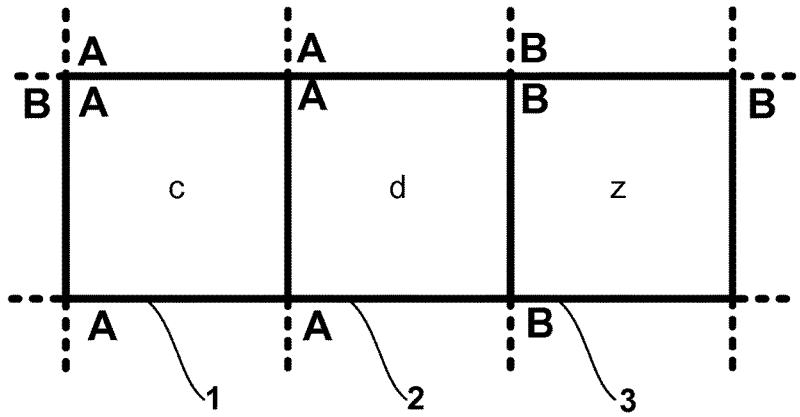
FIG. 1a is a 2D schematic representation of a grid cell arrangement illustrating a known method of attributing low order property values to the cells.

It is frequent, in geosciences and other disciplines, to represent an uncertain 3D system using:
1. A fixed discretisation of space (grid).
2. Sets of equi-probable realizations of high order, 3D, discrete properties which sample, on the pre-defined support of information, the prior knowledge of 3D discrete property boundary location. Such sets of equi-probable realizations are often derived from geo-statistical processes.
3. Geo-statistical laws controlling the 3D distribution of low order, continuous properties for each value of the high order, discrete properties.

In such setting, multiple realizations of low order, 3D, continuous properties conditioned to high order, discrete properties are obtained in what is often referred to as a "cookie cutter" approach. In the cookie cutter approach, previously determined 3D low order property fields are sampled as a function of the high order, discrete 3D property realization. A typical example consists of geological uncertainties being represented by a Corner Point Geometry grid, with facies realizations governing net-to-gross, porosity and X, Y and Z permeability realizations.

An ensemble of models built using such an approach are often used:

In uncertainty analysis to infer, using a simulator imbedding physical laws, the impact of simulator input (model) uncertainties on simulated variables of technical or economic significance.

As input for global inversion (assisted history match) processes in which an algorithm is used to infer, from analysis of simulation results over a range of model realizations, the changes to input models which minimize the difference between true and simulated observations.

It is typically the grid and the low order, continuous properties which actually control the simulation output, not the discrete, high order properties; these high order properties are only used as intermediate step in the modelling process.

It is routinely assumed in such processes that the association of a fixed grid with sets of properties is dependent only on the high order properties, where the sets of properties associate equi-probable high order discrete realizations of one or more discrete properties with secondary continuous properties. Following this. it is further assumed that the cookie cutter approach constitutes an unbiased representation of a priori uncertainties.

However, this is not the case. This representation represents a biased capture of the knowledge described in bullet points 1 to 3 above. Indeed, the representation comprises only models in which the discrete property boundary coincides with a grid cell boundary, while no such hypothesis is present in bullet points 1 to 3 above. The statistical laws controlling the 3D distribution of low order continuous properties for each value of the high order discrete properties do not allow direct estimation of low order properties for cells not belonging with certainty to and/or entirely within a single high order property.

In such common circumstances, the representation of uncertainty is biased, and such bias typically ignored. The bias, in turn, leads to an incorrect estimation of uncertainties on simulated variables (in an uncertainty analysis setting) or an incorrect estimation of match actions in an assisted history match setting (inducing in turn a lower observation fit and/or stronger change than necessary to prior model). It can be shown that such bias has likely limited consequences in one-pass uncertainty analysis processes, and might have more detrimental consequences on iterative inversion processes.

It is proposed to use a class of processes collectively referred to herein as a Conditional Property Interface Filter (CoPIF). Using these processes, a set of model realizations built using the same inputs as per bullet points 1 to 3 above and employing (for example) the traditional cookie cutter approach, can be corrected (under certain circumstances) in an additional modelling step. This creates a new ensemble of realizations of low order properties devoid of the bias that a facies boundary is only at a cell face. Various variants of the approach have also been identified.

The CoPIF is applicable to each realization separately but is proposed as an ensemble correction method. When applied to a single regularization, it will blur the single image, while improving it statistically.

The CoPIF can be applied to sets of properties associating multiple high order, discrete properties (e.g. facies) with multiple low order, continuous properties. For the sake of simplicity, the following text will limit the description to a single high order property controlling multiple low order properties. However, it should be appreciated that the CoPIF is equally applicable to other scenarios, including those more complex.

The CoPIF is applicable to structured grids in which cells have a fixed number of neighbours and strictly defined cell shapes (e.g. Corner Point Geometry) and also to unstructured grids comprising cells which have a variable number of neighbours and more freedom in cell shapes (including a mixture of cell shapes, for example: tetrahedron, hexahedron, octahedron, etc.).

The CoPIF can be applied before or after application of the cookie cutter approach (as further explained below); in the former case the CoPIF essentially acts as a replacement for the cookie cutter approach.

The main steps of the process are provided below, described in terms of two sub-processes: 1) the splitting of cells into elementary volumes and 2) the attributing low order cell properties to the elementary volumes:

1) Split Cells into Elementary Volumes

Define each cell centre, typically as the barycentre of the cell volume. An alternative to defining the cell centre as the barycentre may comprise deriving the cell centre from a global grid box, knowing average cell sizes in three directions and ignoring local cell size variations. If the cell sizes do not vary too much around the mean, approximate "centres" can be defined faster or more easily in this way.

Determine, for each cell face of each cell, the volume linking the cell face to the cell barycentre.

Define intermediate points at a common intermediate distance from each point at a cell face and the cell barycentre—the intermediate point may be the mid-Euclidian distance between the point at the cell face and the cell barycentre—and:

Define each half base elementary volume (peripheral sub-cells) as being defined by each cell face and an intermediate face defined by the corresponding ensemble of intermediate points between a single face and the barycentre.

Define each half top elementary volume (central sub-cells) as being defined by the intermediate face as defined above and the cell barycentre.

A fast way of defining the elementary volumes is to define intermediate points at a common intermediate distance between each face vertex and the barycentre. These intermediate points define the vertices of the intermediate face, which can then define the elementary volumes as already described.

2) Attribute Low Order Cell Properties to the Elementary Volumes

Half top elementary volumes have attributed thereto the input low order properties of the cell being considered, corresponding to the discrete high order property for the cell being considered.

Half base elementary volumes have attributed thereto:
where the base of the half base elementary volume is adjacent a neighbouring cell having the same high order discrete property value: the input low order properties of the cell being considered corresponding to the discrete high order property of the cell being considered.

where the base of the half base elementary volume is adjacent a neighbouring cell having a different high order discrete property value: the input low order properties of the cell being considered corresponding to the discrete high order property of the adjacent cell.

Compute cell-scale properties from elementary volume properties. This step may take into account the relative elementary volume sizes, and compute weights accordingly.

FIG. 1 is a very simple 2D example illustrating the above method compared to a traditional approach. FIG. 1a illustrates the traditional cookie cutter approach for background. It shows three adjacent cells labelled 1, 2 and 3 in full and the cells neighbouring cells 1, 2, 3 in part. Each cell 1, 2, 3, and their neighbours have attributed thereto a high order property: facies A or B (e.g. sand or shale). The table to the left is the mapping table which shows the corresponding low order conditional property for each cell, depending on its high order property (facies A or Facies B). Such a table is calculated in advance and maintained. When populating the grid, the value attributed to a particular cell is the value corresponding to the appropriate high order value for that cell as logged in the table. In the specific example here, as cell 1 comprises facies A, it has attributed to it the low order property value "c" from the table. Similarly, cells 2 and 3 have attributed to them the low order property values "d" and "z" respectively.

Figure 1B:
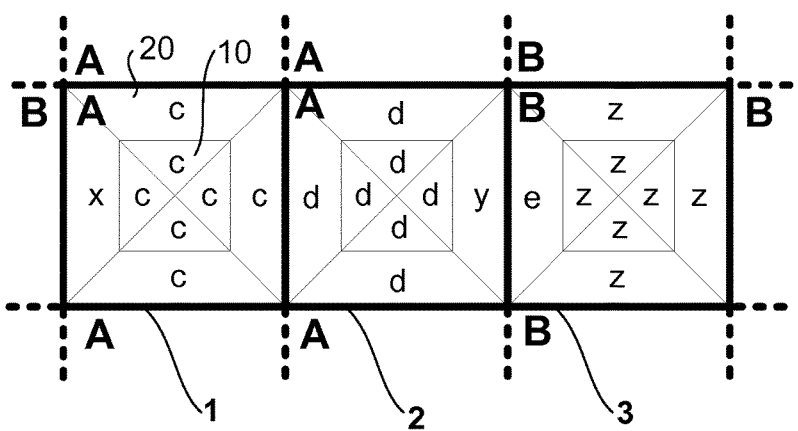
FIG. 1b is a 2D schematic representation of a grid cell arrangement illustrating a method of attributing low order property values to the cells according to a first embodiment.

FIG. 1b illustrates the effect of application of the CoPIF. First of all, each cell 1, 2, 3, is divided in accordance with sub-process 1) above. Of course, in this 2D example each cell is divided into four half top elementary areas 10 and four half base elementary areas 20.

Considering sub-process 2) in terms of cell 1, the four half top elementary areas 10 are assigned from the table with the low order property "c" for cell 1 having high order property A, as this is the high order property applicable to this cell. With regard to the half base elementary areas, consideration is made of the high order property of the neighbouring cell. Here cell 1 is bordered on three sides (top, bottom, right) by cells of the same facies A and on one side (left) by a cell of a different facies B. Where the half base elementary area borders a cell of the same high order property, it is attributed with the low order property value for its own cell. For example, these cells are attributed with the low order property value "c" in the case of cell 1. Considering now, the left half base elementary area of cell 1, as this borders onto a cell of a different facies B, it is attributed with the low order property value it would have if it were itself facies B. Therefore it is attributed with the value for cell 1 for property B, which is "x" in this example.

The final value for the cell 1 can then be an average of the values within the half areas. At its most basic this may be a straight average (and in this specific example the cell would be attributed a low order value of $(7c+x)/8$. Other averaging methods which take into account the relative area sizes (or volumes in the 3D situation) can be used. Appropriate scale up methods are discussed in more detail below The other cells 2, 3 are treated similarly. All the half top elementary areas, and the half base elementary areas bordering a cell of the same high order property are attributed with the low order property for that cell with facies unchanged. In this example all but two of the half elementary areas of cells 2 and 3 fall into these categories. Cell 2 and 3 are themselves of different high order properties, and therefore the half base elementary areas adjacent their common boundary have their facies (high order) property switched, as shown.

In some circumstances, depending on the software being used or storage available, the conditional property mapping data for each realization may not be available. The conditional property mapping data is the data mapping the appropriate conditional property value to a cell in dependence of the high level discrete property value of that cell. A variant of sub-process 2) has been devised for such circumstances and essentially comprises applying the CoPIF before applying the cookie cutter approach.

In this alternative embodiment, the low order property value for each possible high order property value is unknown for a given realization for a particular cell. All that is known is the low order property values of the actual cells for only the specific high order property value attributed thereto. The low order values corresponding to a cell, were it a different facies, is not known. Therefore, when the high level properties of adjacent half base elementary areas are switched, the appropriate low order value for those cells will not be known. In this embodiment, when this happens, the low level value is assumed to be equal to the value in the neighbouring cell of same property and the half base elementary volumes are attributed by directly sampling the pre-defined discrete class-specific low order properties of the considered cell for the discrete class of the adjacent cell. The half top elementary volume is sampled from the class-specific low order properties 3D realization of the class of the considered cell.

Figure 2:
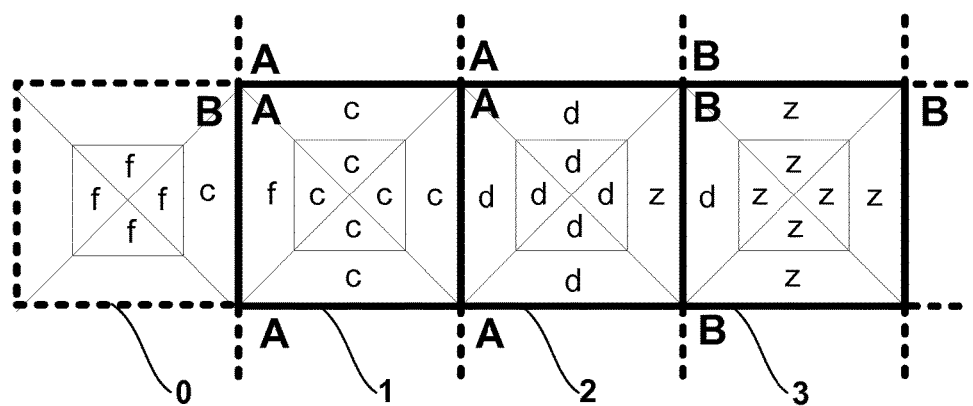
FIG. 2 is a 2D schematic representation of a grid cell arrangement illustrating a method of attributing low order property values to the cells according to a second embodiment.

FIG. 2 is a very simple 2D example illustrating this embodiment. Here, all the half top elementary areas, and the half base elementary areas bordering a cell of the same high order property are attributed with the low order property for that cell. Considering the cells which border a cell of different high order property, for example the boundary between cell 0 and cell 1, the appropriate low level values for the half base elementary areas adjacent the boundary (cell 1, facies B and cell 0, facies A) are unknown. Therefore the low level values themselves are switched. This can be seen at the boundary between cell 0 and cell 1 and the boundary between cell 2 and cell 3.

Any scale-up method can be applied. Scale up methods are typically specific to physical properties being handled. Only the very simplest methods are described herein for the explicit purpose of showing practical applicability of the approach. Embodiments of the invention are not limited to any specific scale up method. The concepts disclosed herein may be used in conjunction with any applicable scale up method, whether disclosed herein or otherwise. An exemplary scale up method is described by the following steps:

Transform set of properties into sets of scalable properties. This may comprise substituting a property within a set of properties with the product of the property being considered and another property.

Example: transforming the following set of properties Net To Gross (NTG), Porosity (PHI) and Permeability (K) into the following set: NTG, Product of NTG and PHI (NTG.PHI), Product of NTG and K (NTG.K).

Apply property specific scale-up methods:
Volume weighted arithmetic averaging.
Example: NTG and NTG.PHI.
Properties suitable to a volume weighted geometric averaging.
Example: NTG.K.

... or any other method suitable to the geometry and property considered, such as volume weighted harmonic averaging, flow simulation based scale-up, etc.

Transform back set of properties into original properties. This may comprise dividing an upscaled property by another.

Example: transform the following set: NTG, NTG.PHI, NTG.K to the following set: NTG, PHI and K by dividing for each cell the result of the scale up of NTG.PHI by NTG to obtain scaled-up PHI and the result of NTG.K by scale-up K to obtain scaled-up K.

The computational cost of the process can be reduced by a range of methods in combination or on a stand alone basis including the following:

Parallel processing of high and low order properties;

Screening cells differing from their neighbour (or screening faces or vertices associated to such cells) for the purpose of limiting cell split, property attribution and scale-up computations to those cells.

Leveraging specifics of the type of grid being handled (e.g. using a constant elementary volume in case of a grid displaying similar cell geometry in all cells).

It should be noted that the methodology disclosed herein relies upon volume calculations performed on grids but is not a specific volume calculation method. Volume calculations typically rely upon triangulation of cell faces and volumes. It is typical that specific rules or processes apply to volume calculations or cell face definition on certain types of grids. The CoPIF can be used while respecting those specific volume calculation rules, and/or respecting rules applicable to specific cell face geometric definitions. It can also be used with generic volume (and/or cell face decomposition) calculation methods or a combination thereof.

It is possible to voluntarily limit the application of the CoPIF to a specific region of the grid based, for example, upon knowledge that the bias is only present there. Similarly it is possible to specifically exclude filtering across a specific cell face region in relation with prior knowledge that the facies boundary location is not uncertain at those specific locations. It has actually been shown that, where there is no uncertainty (or a very small uncertainty) of the facies boundary location, application of the CoPIF can have a detrimental effect. The CoPIF brings value when the location uncertainty is above a certain threshold.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention. For example, while the concepts are described in terms of a 3D grid, it is equally applicable to a 2D, or 1D grid.

The invention claimed is:

1. A method of modelling a subsurface volume for at least one of surveillance, monitoring, optimization, and prediction of hydrocarbon reservoir and well systems, the method comprising:

discretising said subsurface volume to define a grid comprising an array of cells, each cell being defined by cell faces, each cell having attributed thereto one or more high order properties of the subsurface volume;

dividing each cell into a plurality of sub-cells, said plurality of sub-cells comprising: a plurality of central sub-cells adjacent a centre of the cell, and a plurality of peripheral sub-cells, each adjacent a corresponding cell face;

for each of said central sub-cells, and for each of said peripheral sub-cells for which the cell adjacent to that peripheral sub-cell has attributed thereto the same one or more high order properties as that of the cell in which said peripheral sub-cell is comprised, attributing one or more low order property values in accordance with the high order property attributed to the cell in which said peripheral sub-cell is comprised;

for each of said peripheral sub-cells for which the cell adjacent to that peripheral sub-cell has attributed thereto a different one or more high order properties than that of the cell in which said peripheral sub-cell is comprised, attributing one or more low order property values in accordance with the high order property attributed to the cell adjacent to said peripheral sub-cell;

determining one or more low order property values for each cell based on the one or more low order property values attributed to each cell's component sub-cells;

constructing a model of the subsurface volume based on the one or more low order property values; and wherein the method mitigates bias associated with assumption of facies boundaries.

2. The method as claimed in claim 1 wherein the step of attributing one or more low order property values in accordance with the high order property attributed to the adjacent cell, for each of said peripheral sub-cells for which the cell adjacent to that peripheral sub-cell has attributed thereto a different one or more high order properties than that of the cell in which said peripheral sub-cell is comprised, comprises:

attributing the low order property value to each of these peripheral sub-cells according to the determined low order value for a particular cell, attributed with the high order property of the adjacent cell.

3. The method as claimed in claim 1 wherein the step of attributing one or more low order property values in accordance with the high order property attributed to the adjacent cell, for each of said peripheral sub-cells for which the cell adjacent to that peripheral sub-cell has attributed thereto a different one or more high order properties than that of the cell in which said peripheral sub-cell is comprised, comprises:

attributing the low order property value attributed to the corresponding adjacent cell, or to a sub-cell comprised within the corresponding adjacent cell, to each of these peripheral sub-cells.

4. The method as claimed in claim 1, wherein the step of dividing each cell comprises:

defining a cell centre of the cell;

determining, for each cell face of the cell, a volume delineated by edges connecting each of vertices of each cell face to the cell centre; and defining an intermediate face dividing each of said volumes into a volume adjacent the cell centre thereby forming one of said central sub-cells and a volume adjacent the cell face thereby forming one of said peripheral sub-cells.

5. The method as claimed in claim 4 wherein said cell centre is located at a barycentre of the cell and the intermediate face is located at a mid-Euclidian distance between the cell face and the cell barycentre.

6. The method as claimed in claim 1, wherein the grid comprises regular shaped cells, and the step of dividing each cell is performed on only one cell, the remaining regular cells being divided according to sub-cell dimensions of said only one cell.

7. The method as claimed in claim 1, wherein the step of determining one or more low order property values for each cell based on the one or more low order property values attributed to each cell's component sub-cells, comprises averaging the one or more low order property values attributed to each of the sub-cells comprised within the cell, weighted in accordance with relative volumes of each of the sub-cells comprised within the cell.

8. The method as claimed in claim 7 wherein the step of determining one or more low order property values for each cell based on the one or more low order property values attributed to each cell's component sub-cells, comprises transforming the one or more original low order property values attributed to each cell's component sub-cells such that they are defined in terms of scalable properties, performing said averaging and reverse transforming the averaged one or more low order scalable property values such that they are defined in terms of the original low order properties.

9. The method as claimed in claim 1, wherein processing of the high order properties and low order properties is performed in parallel.

10. The method as claimed in claim 1, further comprising the step of using results of said method to aid hydrocarbon recovery from a reservoir.

11. A computer-program product comprising a non-transitory computer-usable medium having computer-readable program code embodied therein, the computer-readable program code adapted to be executed to implement the improved method as claimed in claim 1.

* * * * *